United States Patent [19]

Idelson

[11] 3,789,062

[45] *Jan. 29, 1974

[54] LIGANDS WHICH ARE ALSO SILVER HALIDE DEVELOPING AGENTS

[75] Inventor: Elbert M. Idelson, Newton Falls, Mass.

[73] Assignee: Polaroid Corporation, Cambridge, Mass.

[ * ] Notice: The portion of the term of this patent subsequent to Dec. 21, 1988, has been disclaimed.

[22] Filed: Dec. 29, 1970

[21] Appl. No.: 102,563

Related U.S. Application Data

[63] Continuation-in-part of Ser. No. 881,323, Dec. 1, 1969, Pat. No. 3,629,336, Continuation-in-part of Ser. No. 487,054, Sept. 13, 1965, abandoned.

[52] U.S. Cl............. 260/463, 260/479 R, 260/590, 260/592, 260/600
[51] Int. Cl......................... C07c 49/82, G03c 1/02
[58] Field of Search.......260/463, 590, 592, 479 R, 260/881, 233, 487, 54

[56] References Cited

UNITED STATES PATENTS

| | | | |
|---|---|---|---|
| 3,629,336 | 12/1971 | Idelson................................ | 260/590 |
| 3,131,219 | 4/1964 | Blout et al.......................... | 260/575 |
| 3,135,604 | 6/1964 | Green et al............................ | 96/29 |

OTHER PUBLICATIONS

Chemical Abstracts Vol. 46, 8078g (1952)

Primary Examiner—Lewis Gotts
Assistant Examiner—Diana G. Rivers
Attorney, Agent, or Firm—Brown & Mikulka; John P. Morley

[57] ABSTRACT

Novel compounds or coordinating agents which can form a coordination complex with a metal and which include an ortho or para disubstituted phenyl radical. The compounds are useful as intermediates for providing colored dyes.

10 Claims, No Drawings

LIGANDS WHICH ARE ALSO SILVER HALIDE DEVELOPING AGENTS

CROSS REFERENCE TO PENDING APPLICATIONS

This application is a continuation-in-part of U. S. Pat. No. 3,629,336 filed Dec. 1, 1969 as a continuation-in-part of U.S. application Ser. No. 487,054, filed Sept. 13, 1965 and now abandoned.

BACKGROUND OF THE INVENTION

1. The Field of the Invention

This invention relates to photography. More precisely, the invention disclosed herein relates to novel compounds particularly useful as intermediates for producing metallized dyes which can provide colored image patterns in photographic products.

2. Description of the Prior Art

Compounds which are coordinating agents and which can form a coordination complex with a metal are known to the art. Those atoms of such compounds which are linked directly to the metal cation are called co-ordinating or donor atoms and each metal ion requires several of these atoms to make up its co-ordination number. According to the number of co-ordinating atoms which it contains, the complex-forming agent or ligand is said to be uni-dentate, etc. Co-ordinating agents are further classified as organic or inorganic. In organic agents, the co-ordination atoms (generally O, N or S) are attached to the carbon skeleton or an organic molecule. One particularly useful application of such compounds is in the field of dye technology to form a stable metal-dye complex, also commonly referred to as a metallized dye.

The present invention is directed to a novel class of substantially colorless organic co-ordinating agents which are useful in photography.

A primary object of this invention therefore is to provide a novel class of co-ordinating agents dyes, which in turn may be employed in photographic products, processes and compositions for forming color images.

Other objects of the invention will in part be obvious and will in part appear hereinafter.

The invention accordingly comprises the products and processes involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

DETAILED DESCRIPTION OF THE PREFERRED EMBODIMENTS

The novel compounds of this invention contain a radical which can be converted to a silver halide developing radical, e.g., a protected dihydroxyphenyl radical. These compounds or co-ordinating agents may be represented by the formula:

$$Y - Z$$

(A)

where $Y$ is a moiety having a radical which can be converted to or otherwise provide a silver halide developing radical and $Z$ is a ligand moiety, i.e., a moiety of a substantially colorless compound containing one or more co-ordinating or donor atoms for forming a metal complex. As examples of radicals which can be converted to silver halide developing radicals, mention may be made of protected dihydroxyphenyl radicals such as p-diacetoxyphenyl, p-dicathyloxyphenyl, p-dimethoxyphenyl, p-dibenzyloxyphenyl etc.

In addition to the above described moieties, the compounds of the present invention may contain other substituents for linking the protected developing moiety to the ligand moiety.

As examples of such linking substituents, mention may be made of aminophenalkyl-thio substituents such as disclosed in U.S. Pat. No. 3,009,958; aminoalkylamino substituents such as disclosed in U.S. Pat. No. 3,002,997; aminophenalkyl substituents such as disclosed in U.S. Pat. No. 3,019,107; alkyl-thio substituents such as disclosed in U.S. Pat. No. 3,043,690; aminoalkyl substituents such as described in U.S. Pat. No. 3,062,884; aminophenyl substituents such as disclosed in U.S. Pat. No. 3,134,811; the acyl substituents such as disclosed in U.S. Pat. No. 3,142,564; the aminophenoxy substituents such as disclosed in U.S. Pat. No. 3,061,434, etc., as well as the various linking substituents disclosed in the application of Elkan R. Blout and Howard G. Rogers, Ser. No. 485,840 filed Feb. 3, 1955, now U.S. Pat. No. 3,255,001.

The ligand moiety may be selected from the various groups of organic ligands heretofore known to the art.

As examples of such ligands, mention may be made of organic acids such as:
citric acid
glycolic acid
glyceric acid
gluconic acid
lactic acid
kojic acid
malonic acid
malic acid
oxalacetic acid
phthalic acid
salicylic acid
succinic acid
tartaric acid
mercaptoacetic acid;
and diketones and aldehydes such as:
acetylacetone
tropolone
β-methyltropolone
salicylaldehyde
α-isopropyltropolone These and other useful ligands are described, for example, in "Instability Constants of Complex Compounds," Yatsimirskii and Vasilev, Pergamon Press Inc., 1960 (Library of Congress Card No. 60–10,220).

The preferred class of ligands of the present invention comprises the diketones and di-aldehydes. These may be defined as β-hydroxy-α-β-unsaturated carbonyl compounds, or compounds capable of tautomerizing to such a structure, and they may also be represented by the following formulae:

(B) 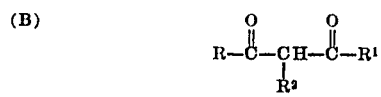

and (C) 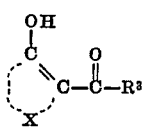

wherein R and R¹ are hydrogen, an alkyl, preferably lower alkyl, alkoxyalkyl, alkylamino, aryl, e.g., phenyl, or a phenylamino radical, or a substituted derivative of these radicals, and may be the same or different; R² may be hydrogen, lower alkyl or a phenyl radical; R³ may be a lower alkyl radical, hydroxy or hydrogen; and X represents the atoms necessary to complete an aliphatic, aromatic or heterocyclic ring. Any of the said R, R¹, R², R³ and/or the ring containing the atoms designated by X may also contain an appropriate radical for linking the developing moiety, e.g., the linking groups heretofore noted.

As examples of this class of ligands, (including those previously listed), mention may be made of the following:

(1) 
acetylacetone (2) 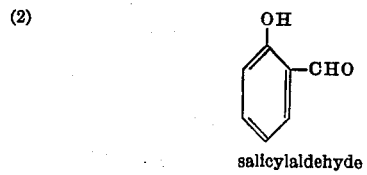
salicylaldehyde (3) 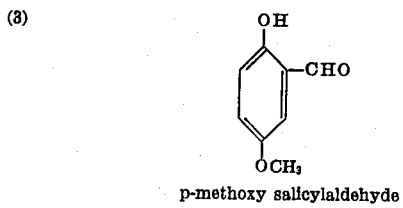
p-methoxy salicylaldehyde (4) 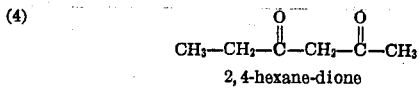
2,4-hexane-dione (5) 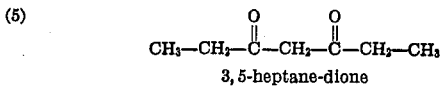
3,5-heptane-dione (6) 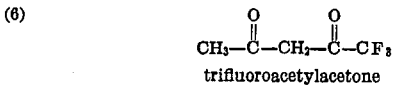
trifluoroacetylacetone (7) 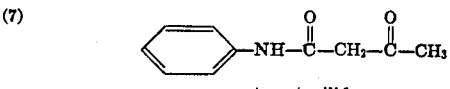
acetoacetanilide (8) 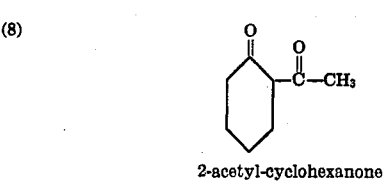
2-acetyl-cyclohexanone (9) 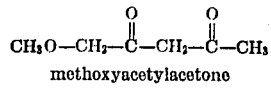
methoxyacetylacetone (9a) 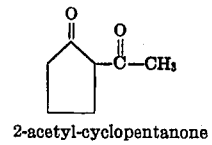
2-acetyl-cyclopentanone The preferred ligands of this invention which contain a ligand moiety within the scope of Formulae (B) and (C), e.g., a ligand of Formulae 1-9a, may be represented by one of the following formulae:

(D) 

(E) 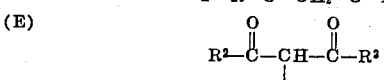

(F) 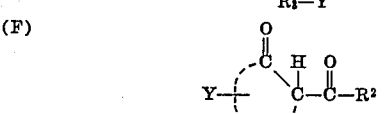

(G) 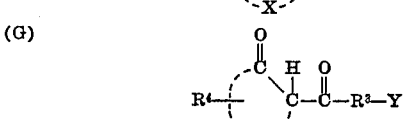

wherein: R is an alkylene radical having from one to six carbon atoms or a substituent chosen from the group consisting of

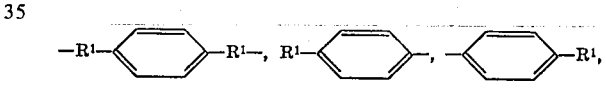

R¹ is an alkylene radical having from one to six carbon atoms;

each R² is hydrogen or an alkyl radical having from one to six carbon atoms;

each R³ is an alkylene radical having from one to six carbon atoms;

R⁴ is an alkyl radical having from one to three carbon atoms, an alkoxy radical having from one to three carbon atoms or H;

X represents the atoms necessary to complete a cyclopentane, cyclohexane or a benzene or naphthalene ring; and Y is an ortho or paradisubstituted phenyl wherein the substituents can be removed and/or converted to hydroxy groups.

As examples of ligands contemplated by the present invention, mention may be made of the following compounds:

(10) 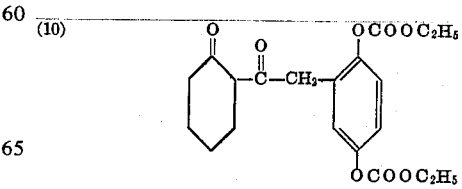

(11) 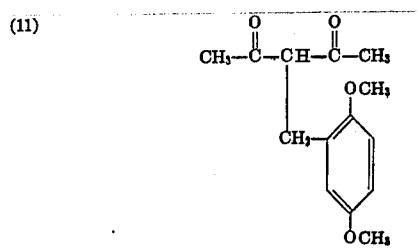
(12) 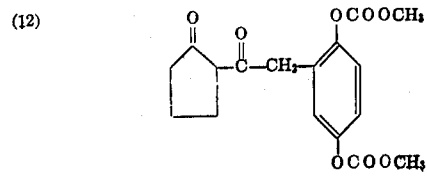
(13) 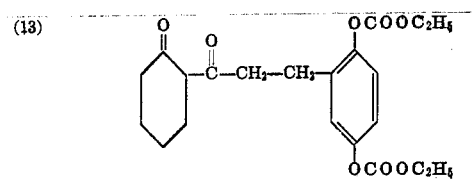
(14) 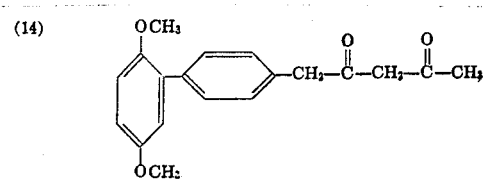
(15) 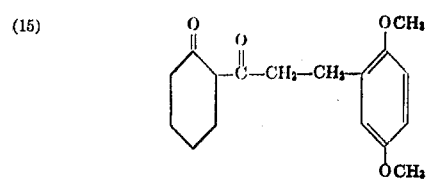
(16) 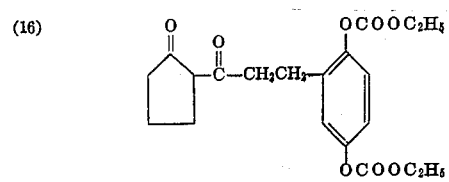
(17) 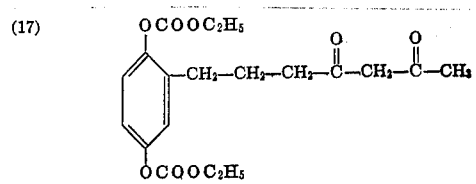
(18) 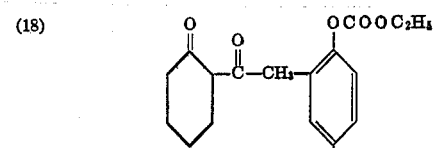
(19) 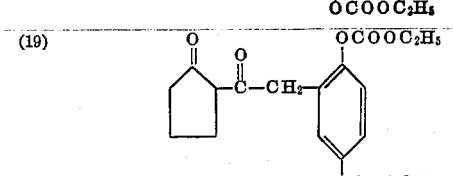
(20) 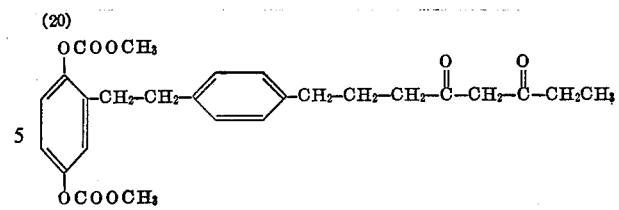
(21) 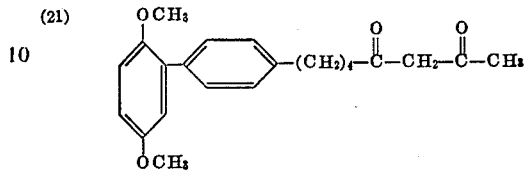
(22) 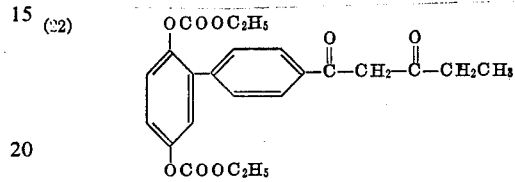
(23) 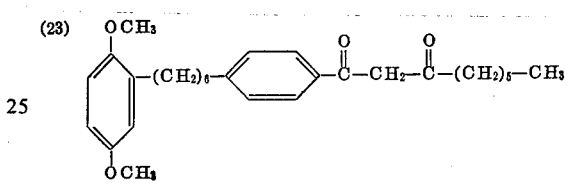
(24) 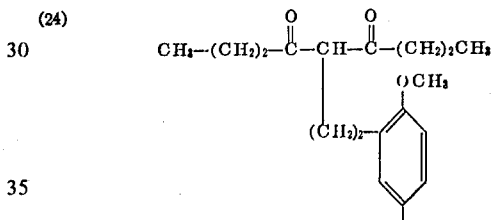
(25) 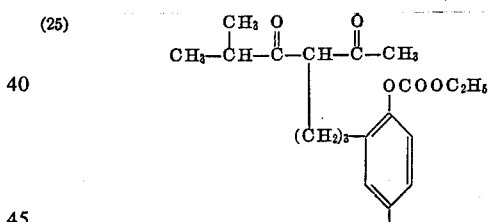
(26) 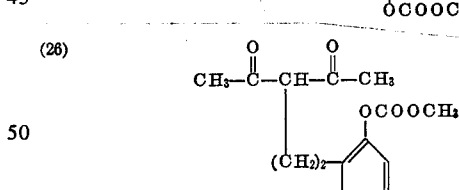
(27) 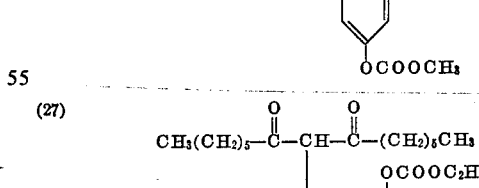
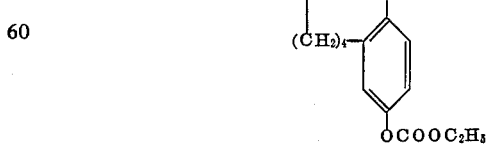

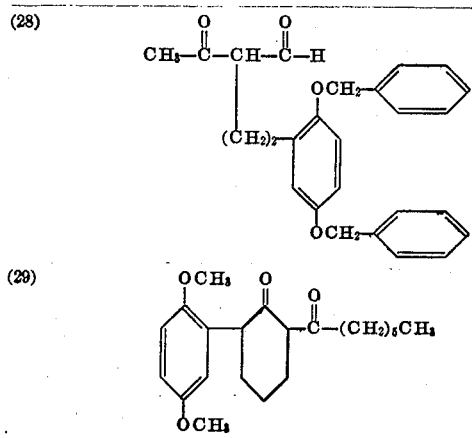
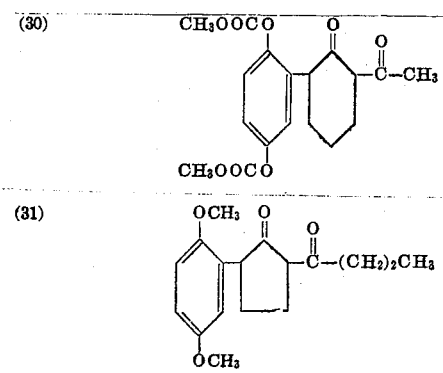
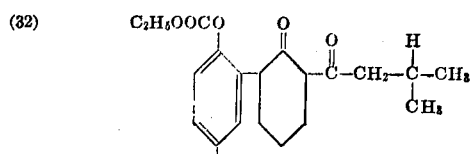
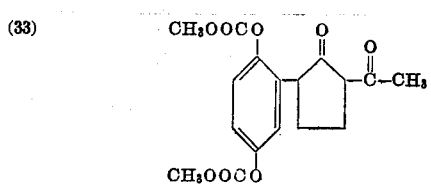
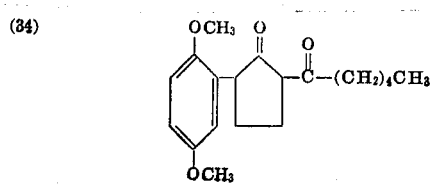
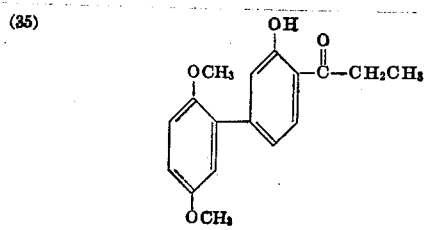
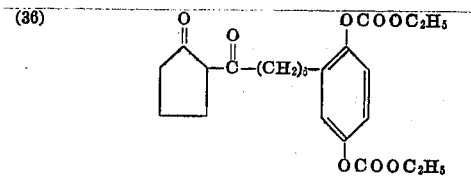
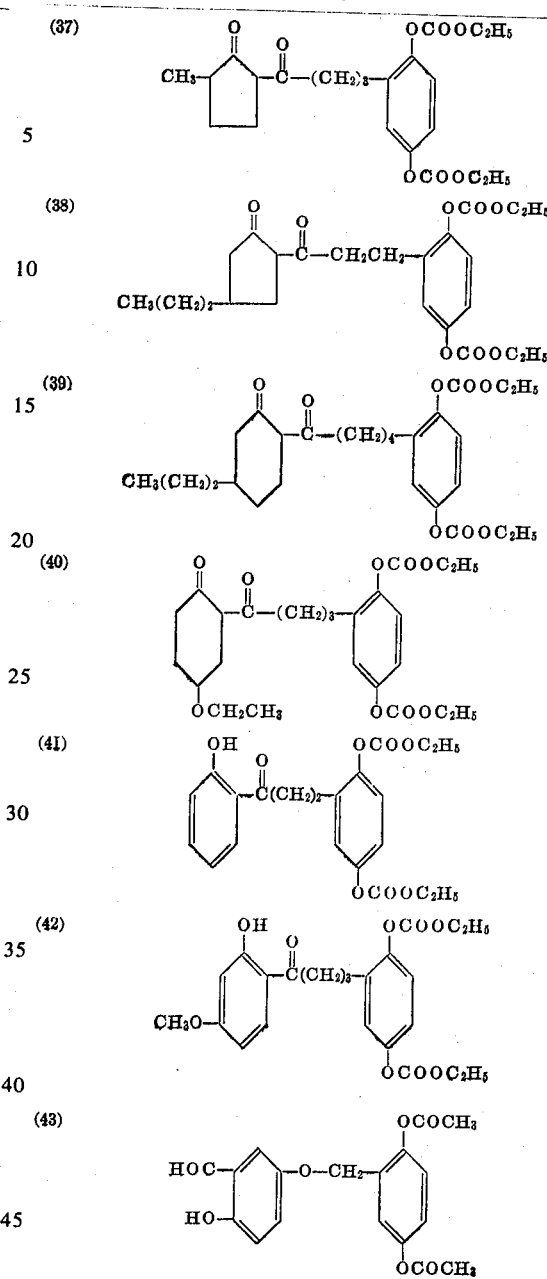

The preparation of the novel compounds of this invention will become apparent to those skilled in the art in the light of the foregoing disclosure and illustrative examples.

In general, these ligands can be prepared by appropriate reactions between compounds providing the Y and Z moieties. As mentioned, compounds providing the Y moiety are those containing protected silver halide developing substituents, e.g., dihydroxyphenyl substituents and compounds containing the protected substituents can be prepared in manners known to the art, et., by alkylation benzylation or acylation.

By way of illustration, ligands such as that represented by Formula 43 may be prepared by appropriate reaction between a bromoalkyl substituent on a compound having a protected dihydroxyphenyl radical and the phenolic hydroxyl group on the compound providing the ligand moiety, e.g., by reacting 2-bromomethyl-1,4-diacetoxy-benzene with 2,4-dihydroxybenzaldehyde.

The following examples show by way of illustration and not by way of limitation the preparation of the novel compounds of this invention.

EXAMPLE 1

To a mixture of 33.4 g. of 1-N-morpholinocyclohexene in 150 ml. of benzene was added 33 g. of 2,5-biscathyloxy-phenylacetyl chloride. The mixture was stirred for 1 hour and then refluxed for 1½ hours. The resulting solid was filtered and washed with ether. The filtrates were then shaken with dilute hydrochloric acid and the solvents were evaporated. The copper chelate of the resulting $\beta$-diketone product was formed in 95 percent ethanol with 20 g. of cupric acetate at about 60° C. The mixture was cooled and the solid copper complex was collected. This complex was then decomposed by stirring with methylene chloride and 10 percent sulfuric acid. Evaporation of the solvent left 15.4 g. of an oil which crystallized to a solid (Formula 18) melting at 58° – 65° C.

EXAMPLE 2

35.8 g. of 2.5 dimethoxybenzaldehyde may be condensed with 24.2 g. of acetylacetone in 150 ml. of benzene, using 7 ml. of piperidine as catalyst to form a compound having the following structural formula:
mp about 180°C

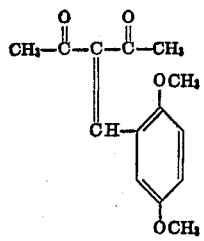

5.0 g. of the latter compound was hydrogenated in 100 ml. of methanol over a Raney nickel catalyst until the theoretical amount of hydrogen was absorbed to yield the compound of Formula 11.

EXAMPLE 3

To a mixture of 16.7 g. of 1-N-morpholinocyclopentene and 16.7 g. of triethylamine in 150 ml. of benzene was added 16.5 g. of 2,5-bis-cathyloxy-phenylacetyl chloride. Formation of the copper complex followed by decomposition with methylene chloride and evaporation of the solvent, all in the manner described in Example 1, yielded 9.2 g. of the ligand of Formula 19.

EXAMPLE 4

Step 1.

The following ingredients were placed in a 5 liter three neck flask:
 2,5 Dimethoxy benzaldehyde — 447 grams
 malonic acid — 559 grams
 pyridine — 1,080 mls.
The mixture was heated to 50°C to obtain solution; then 40 mls. of piperdine were added and the reaction mixture heated at 80°–85°C for 2 hours followed by refluxing for an additional 3 hours. The solution was cooled (overnight), poured into 11 liters of $H_2O$ and acidified slowly with 1 liter conc. HCl. to provide the product dimethoxy cinnamic acid which was filtered and washed with water.
Step 2.

The following ingredients were placed in a 2 liter Parr bottle:
 Dimethoxy cinnamic acid — 200 gms.
 Isopropyl alcohol — 1,100 mls.
 Pd/BaSO$_4$ (5%) — 10 gms.
The hydrogenation of the dimethoxy cinnamic acid was carried out to theoretical uptake. The catalyst (Pd/BaSO$_4$) was filtered and the solution treated with Norite and then stripped to dryness to recover the dimethoxy hydrocinnamic acid.
Step 3.

5.3 kgs of dimethoxyhydrocinnamic acid were dissolved in 5 liters 48 percent HBr solution. The reaction mixture was brought to reflux to distill off all the low boiling material up to 120°C. Refluxing was continued for about 3 hours. After cooling the mixture to room temperature, the precipitate was filtered off and washed well with water, giving 2.5-dihydroxydihydrocinnamic acid lactone.
Step 4.

A solution of 730 gms. NaOH in 12.5 liters $H_2O$ was deaerated and then, 750 gms. lactone were added to it. The reaction mixture was stirred at room temperature for 2 hours and then cooled to 10°C. 2.0 kgms ethyl chloroformate were added at a slow enough rate to maintain the temperature at 10°C. The reaction mixture was stirred for an additional ½ hour and acidified to pH 2.0 with 1.8 liter 10 percent HCl solution. The water was decanted from the oil which formed, the oil was washed several times with water. (The water washes remove any unreacted ethyl chloro formate.) The oil was allowed to solidify slowly (overnight) to provide a crude yield of dicathyloxy hydrocinnamic acid.

The crude yield of dicathyloxy hydrocinnamic acid was purified by dissolving 200 gms. of the product of step 4 in 2 liters of ligroin. The solution was heated to 80°C, and 1 liter benzene was added to dissolve the crude product while the temperature was maintained at $\approx$80°C. The solution was treated with Norite and filtered hot. On cooling, the pure product precipitated. (Some oil formed at first but solidified on standing.) The product was then filtered and washed with hexane.

Step 5.

In a 12 liter, three neck flask 890 gms. of the product of step 4 were dissolved in 3.4 liters thionyl chloride (freshly distilled). The reaction mixture was heated with a heating mantle and refluxed (overnight). At the end of the reaction time the excess thionyl chloride was distilled in vacuo and the product residue cooled to room temperature. Then 1 liter benzene (dry) was added and the solution was treated with Norite and filtered at room temperature. The solution was then added to 10 liters hexane which had been pre-cooled to −25°C. The acid chloride (VI) precipitated. (Care must be taken to avoid the oiling out of the product. It is best to precipitate an aliquot first in order to have seeds for the large precipitation.) The product (dicathyloxy phenyl propionyl chloride) was then filtered and dried thoroughly.

Step 6.

A solution was prepared containing 270 gms. morpholine enamine of cyclopentanone and 120 mls. triethylamine in 870 mls. of benzene (dry). A solution of 600 gms. dicathyloxy phenyl propionyl chloride in 870 mls. benzene (dry) was added with stirring to the enamine solution. Et₃N · HCl formed and the reaction mixture became a heavy slurry. The reaction slurry was stirred at reflux for 1 ½ hrs. The slurry was then cooled and 290 mls. 10N HCl were added. The reaction mixture was refluxed for an additional 2 hours. On cooling, the organic layer was separated and washed several times with water. After drying the organic layer over MgSO₄ the benzene was stripped off to obtain the compound of Formula 16.

The morpholine enamine used in step 6 was prepared as follows:

A solution was prepared containing 1,568 gms. of morpholine and 756 gms. cyclopentanone in 2.7 liters benzene. The solution was refluxed (overnight) while removing the water which formed with a Dean-Stark trap. After stripping off the benzene, the residue was distilled at 70°–80°C. at 0.5 mm. Hg. to give the morpholine enamine.

As was mentioned previously, the novel class of ligands of this invention and the protected derivatives thereof are particularly useful as intermediates in the preparation of metallized dyes which in turn may be employed in photographic products, processes and compositions for forming color images.

These metallized dyes and the preparation thereof utilizing the novel ligands of this invention are described and claimed in U.S. Pat. No. 3,563,739 filed Feb. 11, 1969.

What is claimed is:

1. A compound selected from the group consisting of compounds of the formulae:

(A)
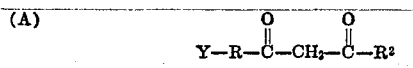

(B)
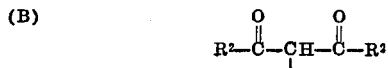

(C)

(D)
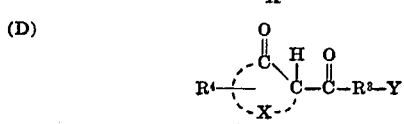

wherein: R is an alkylene radical having from one to six carbon atoms or a substituent chosen from the group consisting of

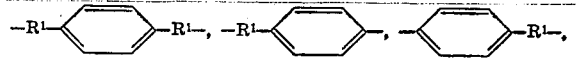

R¹ is an alkylene radical having from one to six carbon atoms;

each R² is hydrogen or an alkyl radical having from one to six carbon atoms;

each R³ is an alkylene radical having from one to six carbon atoms;

R⁴ is an alkyl radical having from one to three carbon atoms, an alkoxy radical having from one to three carbon atoms or H;

X represents the atoms necessary to complete a cyclopentane ring or a cyclohexane ring; and Y is p-diacetoxyphenyl, p-dicathyloxyphenyl, p-dimethoxyphenyl or p-dibenzyloxyphenyl.

2. A compound of claim 1 corresponding to the following formula:

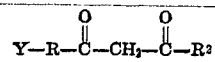

wherein: R is an alkylene radical having from one to six carbon atoms or a substituent chosen from the group consisting of

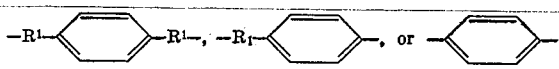

and R¹ is an alkylene radical having from 1–6 carbon atoms;

R² is hydrogen or an alkyl radical having from one to six carbon atoms; and

Y is p-diacetoxyphenyl, p-dicathyloxyphenyl, p-dimethoxyphenyl or p-dibenzyloxyphenyl.

3. A compound of claim 2 of the formula:

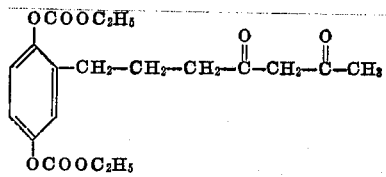

4. A compound of claim 1 corresponding to the formula:

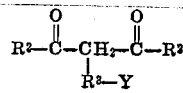

wherein: each R² is hydrogen or an alkyl radical having from one to six carbon atoms;

R³ is an alkylene radical having one to six carbon atoms; and Y is p-diacetoxyphenyl, p-dicathyloxyphenyl, p-dimethoxyphenyl or p-dibenzyloxyphenyl.

5. A compound of claim 4 of the formula:

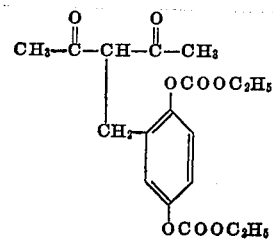

6. A compound of claim 1 corresponding to the formula:

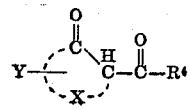

wherein: $R^4$ is hydrogen or an alkyl radical having from one to six carbon atoms;

X represents the atoms necessary to complete a cyclopentane ring or a cyclohexane ring; and Y is paradihydroxyphenyl.

7. A compound of claim 1 corresponding to the formula:

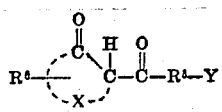

wherein $R^5$ is an alkylene radical having one to six carbon atoms;

$R^6$ is an alkyl radical having one to three carbon atoms, an alkoxy radical having one to three carbon atoms or hydrogen;

X represents the atoms necessary to complete a cyclopentane ring or a cyclohexane ring; and Y is p-diacetoxyphenyl, p-dicathyloxyphenyl, p-dimethoxyphenyl or p-dibenzyloxyphenyl.

8. A compound of claim 7 of the formula:

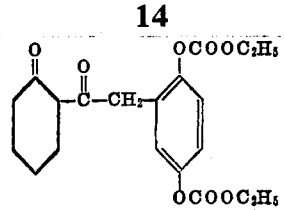

9. A compound of claim 7 of the formula:

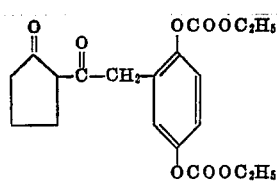

10. A compound of claim 7 of the formula:

* * * * *